US012776801B2

(12) United States Patent
Raghavan et al.

(10) Patent No.: US 12,776,801 B2
(45) Date of Patent: Oct. 27, 2026

(54) MAPPING A PLURALITY OF ANTENNA ELEMENTS TO A RADIO FREQUENCY INTEGRATED CIRCUIT PORT IN A USER EQUIPMENT

(71) Applicant: QUALCOMM Incorporated, San Diego, CA (US)

(72) Inventors: Vasanthan Raghavan, West Windsor Township, NJ (US); Raghu Narayan Challa, San Diego, CA (US); Mohammad Ali Tassoudji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 478 days.

(21) Appl. No.: 18/453,708

(22) Filed: Aug. 22, 2023

(65) Prior Publication Data

US 2025/0070812 A1 Feb. 27, 2025

(51) Int. Cl.
*H04B 1/40* (2015.01)

(52) U.S. Cl.
CPC ...................................... *H04B 1/40* (2013.01)

(58) Field of Classification Search
CPC ...... H04B 1/40; H04B 7/0608; H04B 7/0617; H04B 1/0057; H04B 1/0458; H04B 15/02; H04B 17/14; H04B 17/21; H04B 17/309; H04B 17/318; H04B 2001/0408; H04B 7/0874; H04B 7/10; H04B 1/04; H04B 1/0475
USPC ............................................................ 455/73
See application file for complete search history.

(56) References Cited

U.S. PATENT DOCUMENTS 6,049,705 A 4/2000 Xue
2005/0078649 A1* 4/2005 Tehrani ............... H04L 27/2665 370/343
2011/0250926 A1 10/2011 Wietfeldt et al.
2014/0199952 A1* 7/2014 Sandhu .................. H04B 17/13 455/91
2020/0295854 A1 9/2020 Narra et al.
2020/0314934 A1 10/2020 Raghavan et al.
2021/0136598 A1 5/2021 Raghavan et al.
(Continued)

FOREIGN PATENT DOCUMENTS

WO 0039943 A1 7/2000

OTHER PUBLICATIONS

International Search Report and Written Opinion—PCT/US2024/037583—ISA/EPO—Feb. 13, 2025.
(Continued)

*Primary Examiner* — Ajibola A Akinyemi
(74) *Attorney, Agent, or Firm* — Harrity & Harrity LLP/QUALCOMM Incorporated

(57) ABSTRACT

Various aspects of the present disclosure generally relate to wireless communication. In some aspects, a user equipment (UE) may determine a mapping of more than one antenna element, associated with an antenna module or panel that is integrated with a radio frequency integrated circuit (RFIC), to an RFIC port via one or more switches. The UE may select antenna elements from the more than one antenna element based at least in part on one or more conditions being satisfied. The UE may perform, via the antenna elements, a communication to a network node. Numerous other aspects are described.

30 Claims, 12 Drawing Sheets

(56) References Cited

U.S. PATENT DOCUMENTS

| | | | | |
|---|---|---|---|---|
| 2023/0140655 | A1* | 5/2023 | Onaka | H01Q 1/422 343/702 |
| 2023/0216557 | A1* | 7/2023 | Woo | H04B 1/00 455/73 |

OTHER PUBLICATIONS

Partial International Search Report—PCT/US2024/037583—ISA/EPO—Nov. 4, 2024.

* cited by examiner

400

700

800

900

1000

MAPPING A PLURALITY OF ANTENNA ELEMENTS TO A RADIO FREQUENCY INTEGRATED CIRCUIT PORT IN A USER EQUIPMENT

FIELD OF THE DISCLOSURE

Aspects of the present disclosure generally relate to wireless communication and to techniques and apparatuses for mapping a plurality of antenna elements to a radio frequency integrated circuit (RFIC) port in a user equipment (UE).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a user equipment (UE) includes one or more memories; and one or more processors coupled to the one or more memories, the one or more processors individually or collectively configured to: determine a mapping of more than one antenna element, associated with an antenna module or panel that is integrated with a radio frequency integrated circuit (RFIC), to an RFIC port via one or more switches; select antenna elements from the more than one antenna element based at least in part on one or more conditions being satisfied; and perform, via the antenna elements, a communication to a network node.

In some implementations, a method of wireless communication performed by a UE includes determining a mapping of more than one antenna element, associated with an antenna module or panel that is integrated with an RFIC, to an RFIC port via one or more switches; selecting antenna elements from the more than one antenna element based at least in part on one or more conditions being satisfied; and performing, via the antenna elements, a communication to a network node.

In some implementations, a non-transitory computer-readable medium storing a set of instructions for wireless communication includes one or more instructions that, when executed by one or more processors of a UE, cause the UE to: determine a mapping of more than one antenna element, associated with an antenna module or panel that is integrated with an RFIC, to an RFIC port via one or more switches; select antenna elements from the more than one antenna element based at least in part on one or more conditions being satisfied; and perform, via the antenna elements, a communication to a network node.

In some implementations, an apparatus for wireless communication includes means for determining a mapping of more than one antenna element, associated with an antenna module or panel that is integrated with the apparatus, to an RFIC port via one or more switches; means for selecting antenna elements from the more than one antenna element based at least in part on one or more conditions being satisfied; and means for performing, via the antenna elements, a communication to a network node.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
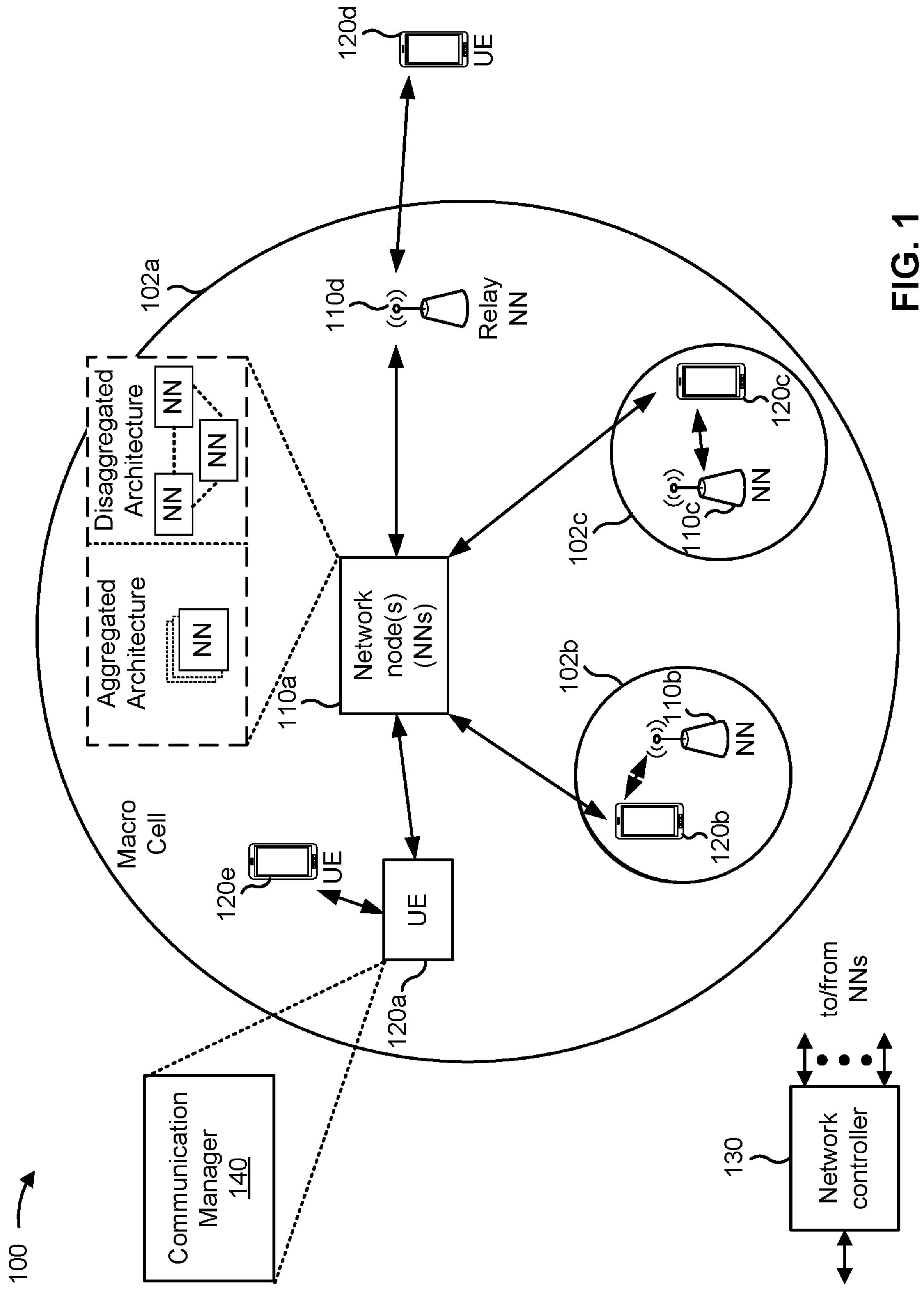
FIG. 1 is a diagram illustrating an example of a wireless network, in accordance with the present disclosure.

In a millimeter wave system, multiple antennas may be used at a UE and/or at a network node. Beamforming from multiple antennas may bridge a link budget in the millimeter wave system. The UE and/or the network node may include multiple antenna modules/panels, where each antenna module/panel may have a set of antenna elements. The set of antenna elements may be co-phased in beamforming. The beamforming may be useful for obtaining an improved link margin, especially in hand/body blockage scenarios. Multiple antenna modules/panels may be used to satisfy a spherical coverage requirement. The spherical coverage requirement may be satisfied with or without hand/body blockage. Each antenna module/panel may provide coverage over different parts of a sphere around the UE. Further, multiple antenna modules/panels may be used to provide robustness with beam switching applied across the antenna modules/panels.

However, each antenna module/panel may need to be integrated with a radio frequency integrated circuit (RFIC), which may result in a relatively high cost associated with implementing the multiple antenna modules/panels. As a result, some original equipment manufacturers (OEMs) may resort to using only a single antenna module/panel, instead of the multiple antenna modules/panels. The single antenna module/panel may still need to be able to provide sufficient coverage, which may be more difficult when compared with the use of multiple antenna modules/panels, which provide relatively good coverage over the sphere.

One approach to obtaining improved coverage with the single antenna module/panel may be designing an antenna module/panel with multiple sides. Each side may correspond to a different boresight direction. The antenna module/panel may include multiple boresight directions with different sides having different boresight directions. For example, the antenna module/panel may be an L-shaped antenna module/panel with two boresight directions, which may point along an edge as well as a back face of the UE. Energy may be combined across these different sides over the overlap region of the two sides, which may result in better coverage. However, even with this approach, the antenna module/panel may still have a limited number of antenna elements that are available for potential use. The limited number of antenna elements in the antenna module/panel may reduce coverage, thereby degrading an overall performance of the UE and/or the network node.

Various aspects relate generally to mapping a plurality of antenna elements to an RFIC port in a UE. Some aspects more specifically relate to configuring more than one antenna element per RFIC port at the UE. In some examples, a UE may determine a mapping of more than one antenna element, associated with an antenna module or an antenna panel (antenna module/panel) that is integrated with the UE, to an RFIC port via one or more switches. The antenna module may be associated with a plurality of antenna elements and a plurality of RFIC ports, where a first quantity associated with the plurality of antenna elements may be greater than a second quantity associated with the plurality of RFIC ports. The UE may select antenna elements from the more than one antenna element based at least in part on one or more conditions being satisfied. The one or more conditions may be associated with power conditions associated with the UE. For example, the UE may select antenna elements based at least in part on a power value associated with the UE satisfying a threshold value. The one or more conditions may be associated with thermal conditions associated with the UE. For example, the UE may select antenna elements based at least in part on a thermal value associated with the UE satisfying a threshold value. The one or more conditions may be associated with elemental gain variations associated with the UE due to changes in UE housing/material properties. For example, the UE may select antenna elements based at least in part on an elemental gain variation associated with the UE satisfying a threshold value. The one or more conditions may be associated with a polarization performance (or polarization mismatch) associated with the UE. For example, the UE may select antenna elements based at least in part on whether or not an antenna element supports a rank-2 polarization MIMO. The one or more conditions may be associated with an impact of a UE housing or other material (e.g., hand/finger) on a performance of the antenna element. For example, the UE may select antenna elements based at least in part on whether or not the UE housing or the other material causes a blockage event for the UE. The UE may perform, via the antenna elements selected from the more than one antenna element, a communication to a network node.

Particular aspects of the subject matter described in this disclosure can be implemented to realize one or more of the following potential advantages. In some examples, by configuring more than one antenna element per RFIC port at the UE, the described techniques can be used to improve a beamforming performance of the UE. The UE may leverage more antenna elements than RFIC ports in a single antenna module/panel of the UE, such that the UE may have more beamforming choices with a same number of RFIC ports. The UE may perform the dynamic mapping and selection of antenna elements (or antenna element ports) to the RFIC ports, which may result in the improved beamforming performance. Antenna elements are relatively low cost, whereas RFICs are relatively high cost, so increasing the number of antenna elements without increasing the number of RFICs, and then selecting certain antenna elements across different sides, may result in a relatively low cost solution that provides favorable coverage, especially in hand/body blockage scenarios. Further, an ability to dynamically select which antenna element is connected to the one RFIC port may help to mitigate against hand/body blockage, especially at millimeter wave frequencies, thereby improving an overall performance of the UE.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*c*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*c*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., the UE 120) may include a communication manager 140. As described in more detail elsewhere herein, the communication manager 140 may determine a mapping of more than one antenna element, associated with an antenna module or panel that is integrated with an RFIC, to an RFIC port via one or more switches; select antenna elements from the more than one antenna element based at least in part on one or more conditions being satisfied; and perform, via the antenna elements, a communication to a network node. Additionally, or alternatively, the communication manager 140 may perform one or more other operations described herein.

As indicated above, FIG. 1 is provided as an example. Other examples may differ from what is described with regard to FIG. 1.

Figure 2:
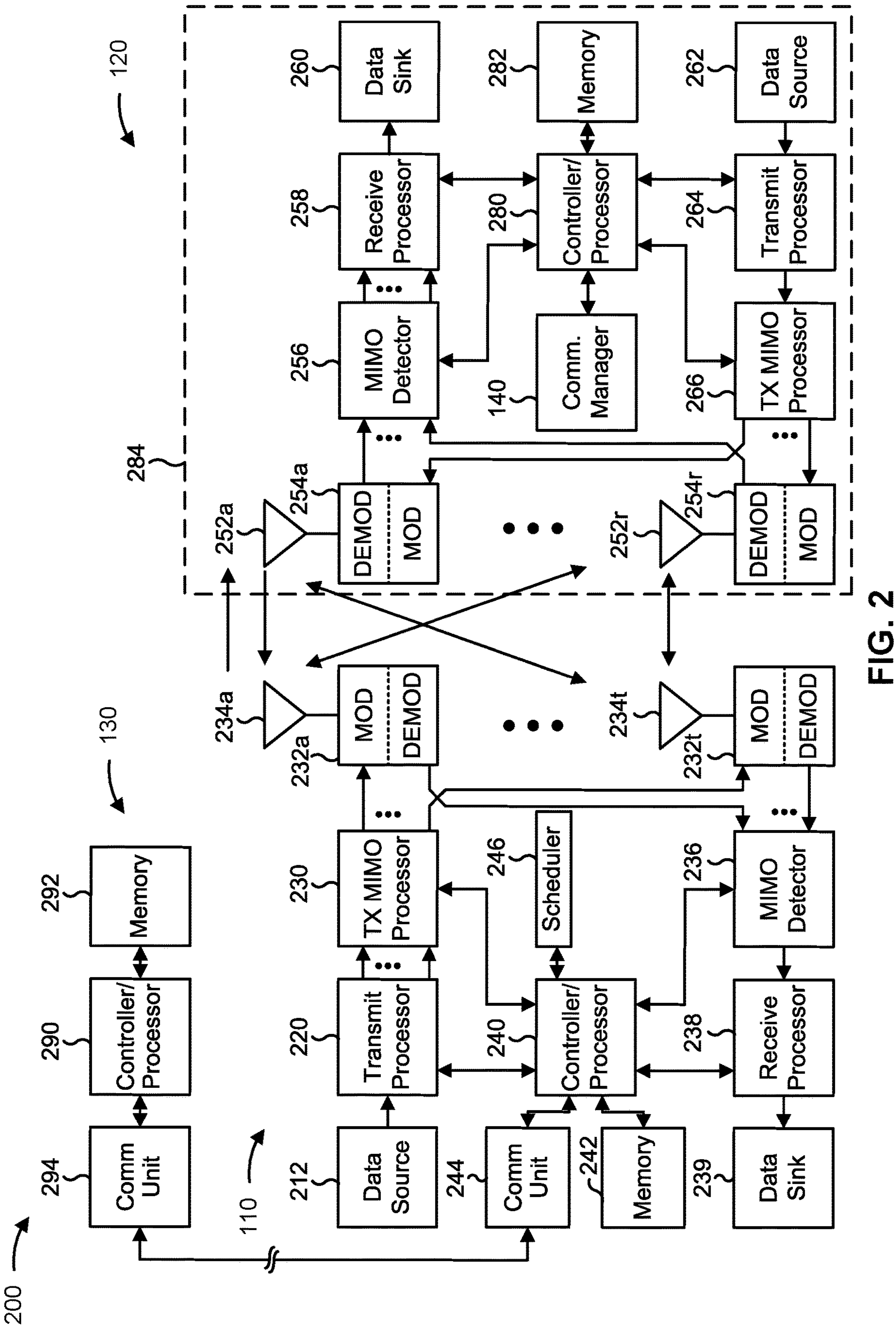
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-12).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-12).

The controller/processor 240 of the network node 110, the controller/processor 280 of the UE 120, and/or any other component(s) of FIG. 2 may perform one or more techniques associated with mapping a plurality of antenna elements to an RFIC port in a UE, as described in more detail elsewhere herein. For example, the controller/processor 240 of the network node 110, the controller/processor 280 of the UE 120, and/or any other component(s) of FIG. 2 may perform or direct operations of, for example, process 1100 of FIG. 11, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1100 of FIG. 11, and/or other processes as described herein. In some examples, executing instructions may include running the instructions, converting the instructions, compiling the instructions, and/or interpreting the instructions, among other examples.

In some aspects, a UE (e.g., the UE 120) includes means for determining a mapping of more than one antenna element, associated with an antenna module or panel that is integrated with an RFIC, to an RFIC port via one or more switches (e.g., using controller/processor 280, memory 282, or the like); means for selecting antenna elements from the more than one antenna element based at least in part on one or more conditions being satisfied (e.g., using controller/processor 280, memory 282, or the like); and/or means for performing, via the antenna elements, a communication to a network node (e.g., using controller/processor 280, transmit processor 264, TX MIMO processor 266, modem 254, antenna 252, memory 282, or the like, or using antenna 252, modem 254, MIMO detector 256, receive processor 258, controller/processor 280, memory 282, or the like). The means for the UE to perform operations described herein may include, for example, one or more of communication manager 140, antenna 252, modem 254, MIMO detector

256, receive processor 258, transmit processor 264, TX MIMO processor 266, controller/processor 280, or memory 282.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
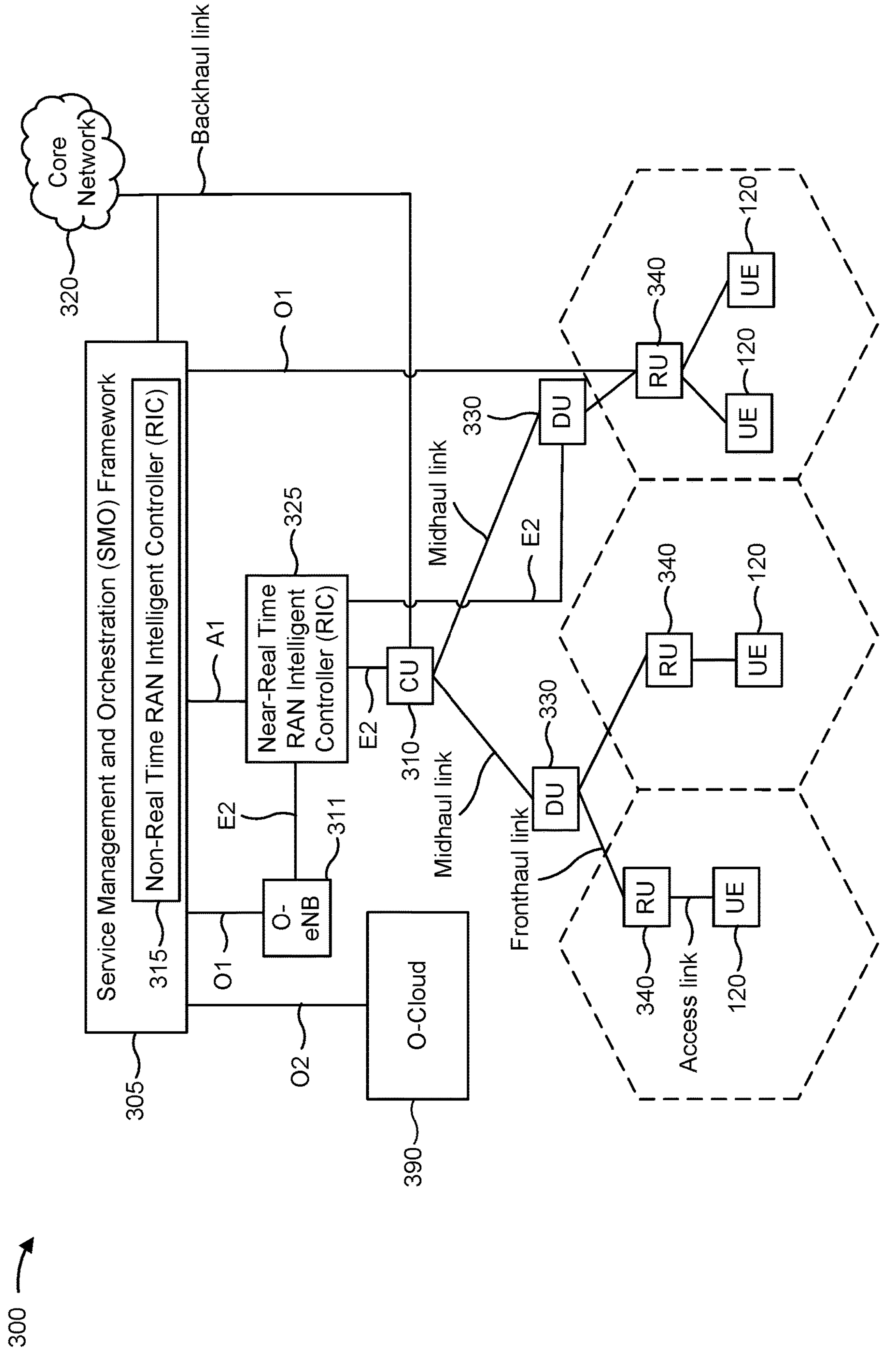
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP)

functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (IFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT. performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

In a millimeter wave system, multiple antennas may be used at a UE and/or at a network node. Beamforming from multiple antennas may bridge a link budget in the millimeter wave system. The UE and/or the network node may include multiple antenna modules/panels, where each antenna module/panel may have a set of antenna elements. The set of antenna elements may be co-phased in beamforming. The beamforming may be useful for obtaining an improved link margin, especially in hand/body blockage scenarios. Multiple antenna modules/panels may be used to satisfy a spherical coverage requirement. The spherical coverage requirement may be satisfied with or without hand/body blockage. Each antenna module/panel may provide coverage over different parts of a sphere. Further, multiple antenna modules/panels may be used to provide robustness with beam switching applied across the antenna modules/panels.

However, each antenna module/panel may need to be integrated with an RFIC, which may result in a relatively high cost associated with implementing the multiple antenna modules/panels. As a result, some OEMs may resort to using only a single antenna module/panel, instead of the multiple antenna modules/panels. The single antenna module/panel may still need to be able to provide sufficient coverage, which may be more difficult when compared with the multiple antenna modules/panels, which provide relatively good coverage over the sphere.

One approach to obtaining improved coverage with the single antenna module/panel may be designing an antenna module/panel with multiple sides. Each side may correspond to a different boresight direction. The antenna module/panel may include multiple boresight directions with different sides having different boresight directions. For example, the antenna module/panel may be an L-shaped antenna module/ panel with two boresight directions, which may point along an edge as well as a back face of the UE. Energy may be combined across these different sides, which may result in better coverage over the overlap region associated with the two sides. However, even with this approach, the antenna module/panel may still have a limited number of antenna elements that are available for potential use. The limited number of antenna elements in the antenna module/panel may reduce coverage, thereby degrading an overall performance of the UE and/or the network node.

In various aspects of techniques and apparatuses described herein, a UE may determine a mapping of more than one antenna element, associated with an antenna module/panel that is integrated with an RFIC, to an RFIC port via one or more switches. The antenna module may be associated with a plurality of antenna elements and a plurality of RFIC ports, where a first quantity associated with the plurality of antenna elements may be greater than a second quantity associated with the plurality of RFIC ports. The UE may select antenna elements from the more than one antenna element based at least in part on one or more conditions being satisfied. The one or more conditions may be associated with power conditions associated with the UE, thermal conditions associated with the UE, elemental gain variations associated with the UE, a polarization performance (or polarization mismatch) associated with the UE, an impact of a UE housing or other material (e.g., hand/finger) on a performance of the antenna element, and/or a blockage event associated with the UE. The UE may perform, via the antenna elements selected from the more than one antenna element, a communication to a network node. For example, the UE may receive, via the antenna elements, a downlink transmission from the network node, such as a base station or another UE. As another example, the UE may transmit, via the antenna elements, an uplink transmission to the network node.

In some aspects, the UE may be equipped with an integrated antenna module/panel, which may operate at millimeter wave carrier frequencies. Antenna module-based communications may also be used at sub-millimeter wave frequencies, such as those at FR3. Within the antenna module/panel, at least one RFIC port may be connected to more than one antenna element via switches. For example, multiple antenna elements may be connected to one RFIC port based at least in part on a many-to-one to-one mapping of antenna elements to RFIC port(s). The many-to-one mapping between the antenna ports and the RFIC port(s) may be based at least in part on one or more switches. In some aspects, the UE may dynamically select one antenna element from a set of more than one antenna elements connected via the switches to the at least one RFIC port to combat hand/body blockage. For example, between a set of four antenna elements connected to the one RFIC port, the UE may dynamically select one particular antenna element, of the four antenna elements, to be connected to the one RFIC port, such that a hand blockage may be avoided.

In some aspects, the UE may leverage more antenna elements than RFIC ports in a single antenna module/panel of the UE. The UE may include, in the single antenna module/panel, more antenna elements than RFIC ports for millimeter wave applications, such that the UE may have more beamforming choices with a same number of RFIC ports. The UE may be configured to perform a dynamic mapping and selection of antenna elements (or antenna element ports) to the RFIC ports, which may result in an improved beamforming performance. For example, such a design may result in a 1.5 dB to 4.2 dB gain. Antenna elements are relatively low cost, whereas RFICs are relatively high cost, so increasing the number of antenna elements without increasing the number of RFICs, and then selecting certain antenna elements across different sides, may result in a relatively low cost solution that provides favorable coverage, especially in hand/body blockage scenarios. An ability to dynamically select which antenna element is connected to the one RFIC port, despite switching losses, may help to mitigate against blockage, especially at millimeter wave frequencies, thereby improving an overall performance of the UE.

Figure 4:
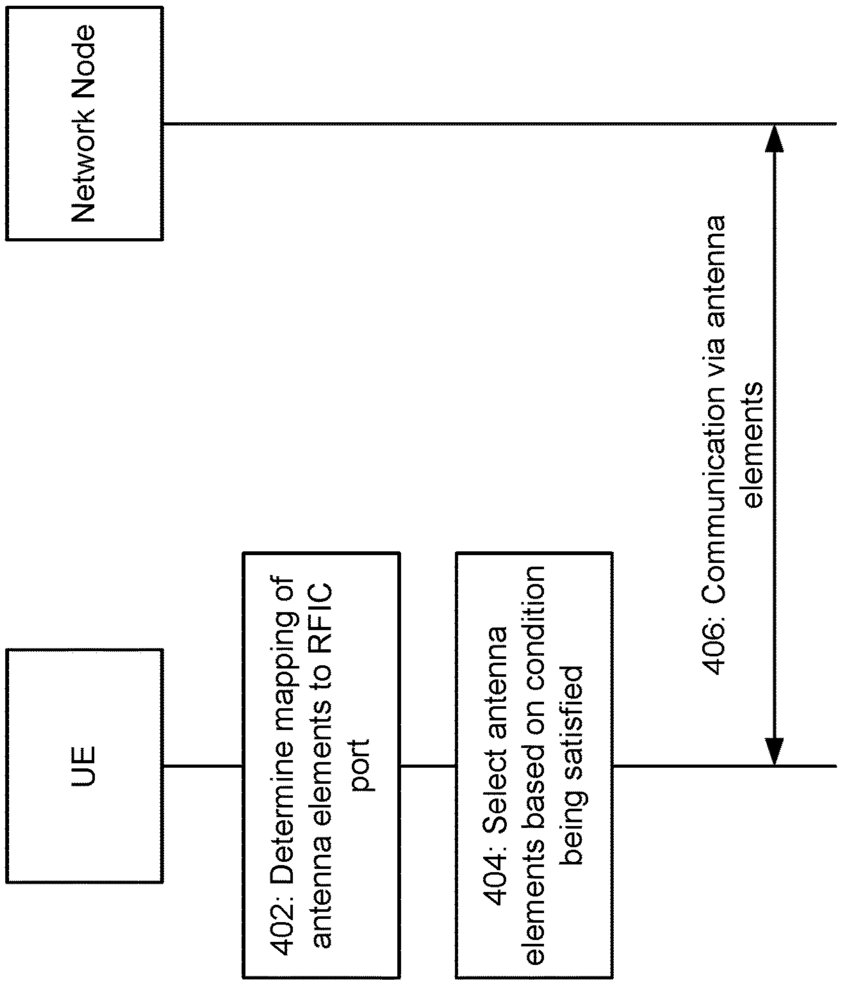
FIGS. 4-10 are diagrams illustrating examples associated with mapping a plurality of antenna elements to a radio frequency integrated circuit (RFIC) port in a UE, in accordance with the present disclosure.

FIG. 4 is a diagram illustrating an example 400 associated with mapping a plurality of antenna elements to an RFIC port in a UE, in accordance with the present disclosure. As shown in FIG. 4, example 400 includes communication between a UE (e.g., UE 120) and a network node (e.g., network node 110). In some aspects, the UE and the network node may be included in a wireless network, such as wireless network 100.

As shown by reference number 402, the UE may determine a mapping of more than one antenna element, associated with an antenna module/panel that is integrated with an RFIC, to an RFIC port via one or more switches. The antenna module may be associated with a plurality of antenna elements and a plurality of RFIC ports. A first quantity associated with the plurality of antenna elements may be greater than a second quantity associated with the plurality of RFIC ports. The mapping of the more than one antenna element to the RFIC port may be done on a per polarization basis. An antenna polarization may be associated with a direction of an electromagnetic field produced by a corresponding antenna element as energy radiates away from the antenna element. The antenna polarization may be a linear polarization, a circular polarization, or an elliptical polarization. The RFIC ports may be associated with the RFIC that is integrated with the antenna module/panel.

As shown by reference number 404, the UE may select antenna elements from the more than one antenna element based at least in part on one or more conditions being satisfied. The UE may select the antenna elements based at least in part on power conditions or thermal conditions associated with the UE. The UE may select the antenna elements based at least in part on elemental gain variations associated with the UE. The UE may select the antenna elements based at least in part on a polarization performance associated with the UE. The UE may select the antenna elements based at least in part on an impact of a UE housing or other material (e.g., hand/body) on a performance of the antenna element. The UE may select the antenna elements based at least in part on a blockage event associated with the UE. The blockage event may be associated with a hand/finger blockage in relation to one or more antenna elements of the antenna module/panel. Further, a switching loss associated with the one or more switches used in selecting the antenna elements, which may be connected to the RFIC port, may be smaller than a beamforming gain associated with a dynamic selection of the antenna elements.

In a typical approach, the technology used to design an RFIC may lead to a certain optimal number of RFIC ports. For example, at 28 GHz, silicon-germanium (SiGe) or complementary metal-oxide semiconductor (CMOS) technology may allow an optimal control of 8-16 RFIC ports per polarization within an integrated chip. For example, FR2 commercial chipsets may use 8 RFIC ports per polarization. At higher carrier frequencies, the number of RFIC ports may change due to a change in the process node technology. In the traditional approach, the number of RFIC ports and a corresponding number of RFIC antenna feeds may be aligned with a number of antenna elements.

In some aspects, since antenna elements/radiators are passive elements, the antenna elements/radiators may be relatively easy to design/generate with a small area/cost increase within a same or marginally increased aperture allocated for the antenna module/panel. The UE may include more antenna elements within the antenna module/panel, which may be controlled, than RFIC ports in the RFIC that is integrated with the antenna module/panel. More than one antenna element may be dynamically mapped and/or connected to an RFIC port. Multiple antenna elements may be mapped to a single RFIC port using a mapping, such as a many-to-one mapping (e.g., many antenna elements to one RFIC port). For example, the antenna module/panel may include 10 antenna elements, and the RFIC may include 8 RFIC ports. The 10 antenna elements may be dynamically mapped to the 8 RFIC ports using the mapping. Further, as a carrier frequency increases (e.g., 60 GHz and above), an optimal number of RFIC ports may decrease (e.g., 8 RFIC ports may change to 6 RFIC ports or 4 RFIC ports), so an ability to increase an overall number of antenna elements and map more than one antenna element to a single RFIC port may be useful. The antenna module/panel may have a limited number of RFIC ports, but relatively more antenna elements (or antenna element ports), and the antenna elements may be mapped to the RFIC ports accordingly.

In some aspects, the mapping between the antenna elements and the RFIC port(s) may be dynamic in time, and may be based at least in part on RF circuitry (e.g., switches). For example, based on the mapping, a first antenna element, a second antenna element, or a third antenna element may be connected to an RFIC port, depending on a setting of a switch. The switch, at a first setting, may allow a first path between the first antenna element and the common RFIC port. The switch, at a second setting, may allow a second path between the second antenna element and the RFIC port. The switch, at a third setting, may allow a third path between the third antenna element and the RFIC port.

In some aspects, when one of a few candidate antenna elements (e.g., the first antenna element and the second antenna element) is dynamically connected to the RFIC port, switching losses may be incurred in selecting the antenna elements from the candidate antenna elements. Thus, any performance improvement in dynamic selection of antenna elements should overcome any associated switching losses. A switching cost may be smaller than a gain that is leveraged using the mapping.

In some aspects, the UE may perform the mapping of more than one antenna element to the RFIC port. The UE may select, from the mapping, a particular antenna element (e.g., the third antenna element) to be connected to the RFIC port at a given time. The UE may connect the particular antenna element to the RFIC port via a switching element. A correct choice of the antenna elements to be selected and connected to the RFIC port may be a function of one or more of: power/thermal concerns, element gain variations, a polarization performance (e.g., whether or not an antenna element is able to support rank-2 polarization MIMO), and/or an impact of a UE housing or other material (e.g., hand/body) on an antenna element performance. In some aspects, depending on channel conditions and/or a UE operation, and depending on the mapping, the UE may select which antenna element to connect to the RFIC port. The UE may dynamically select the antenna elements based at least in part on the function. For example, the UE may select the antenna elements from a set of multiple antenna elements, associated with the mapping, based at last in part on power conditions, thermal conditions, polarization mismatches, and/or hand/body blockages.

Figure 5:
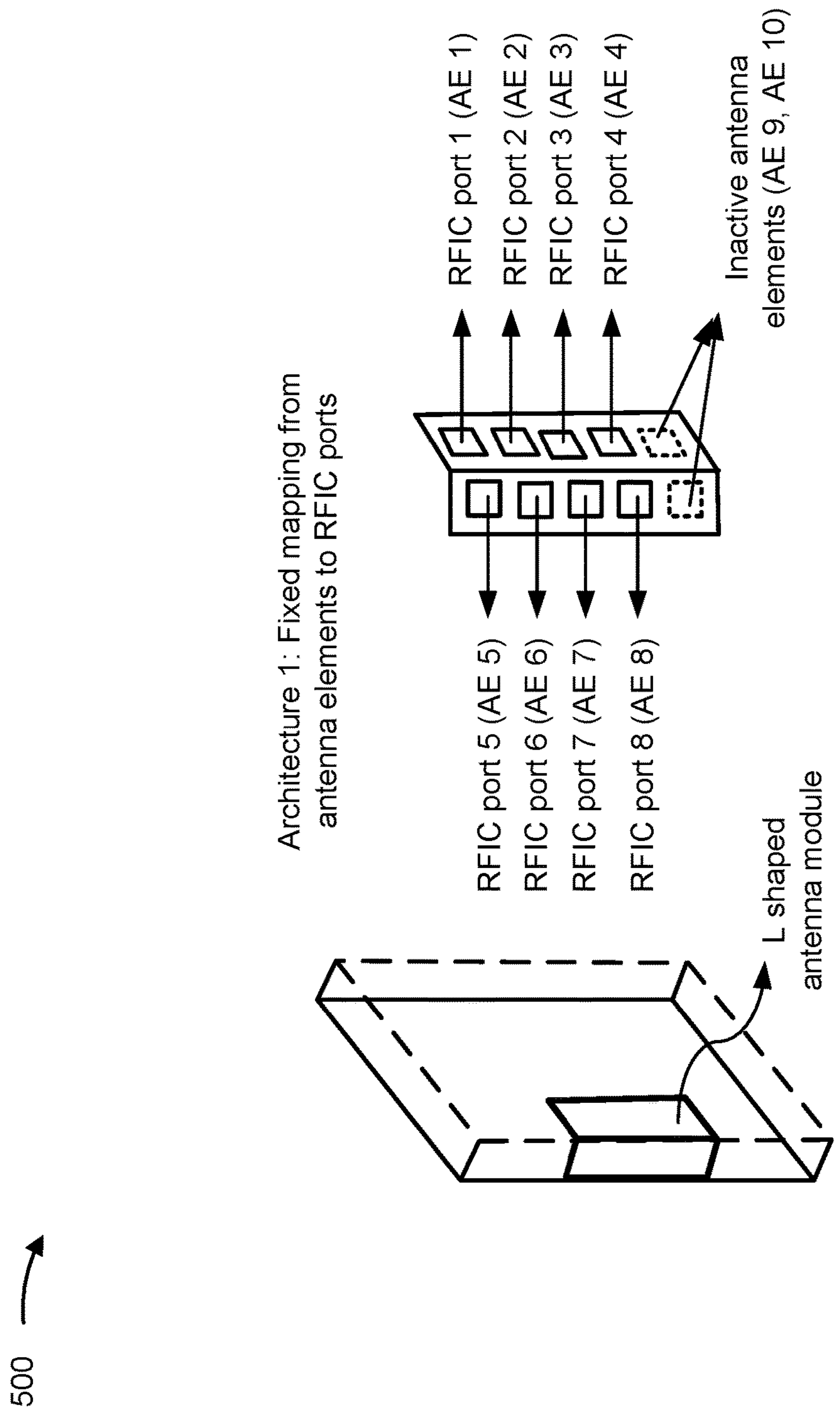
Figure 6:
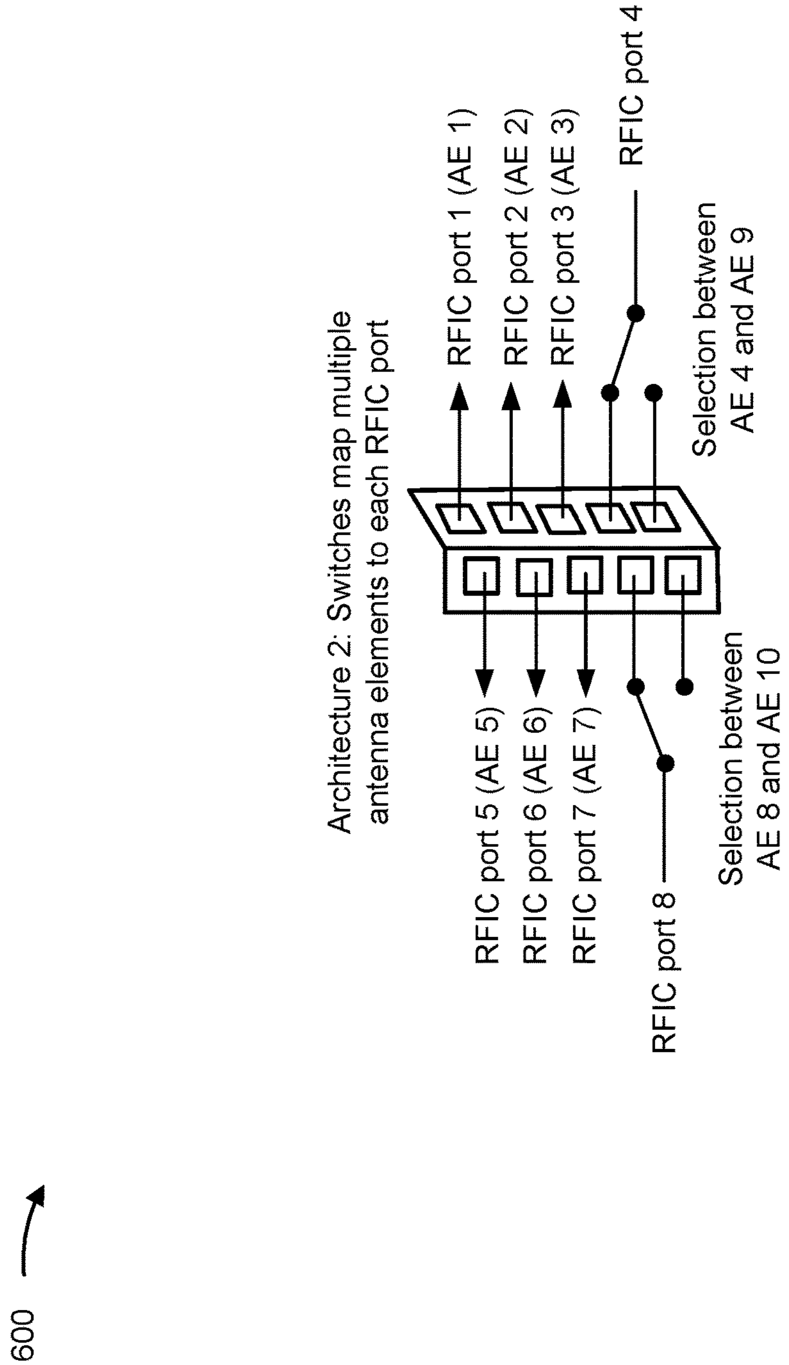

In some aspects, the antenna module/panel may be an L-shaped antenna module/panel. In some aspects, the antenna module/panel may be based at least in part on a first architecture, in which a fixed mapping may be defined between antenna elements and RFIC ports (e.g., as shown in FIG. 5). The antenna module/panel may have 10 antenna elements on two sides, but only 8 RFIC ports. With the first architecture, 8 antenna elements may be mapped in a fixed manner to 8 RFIC ports (e.g., antenna element 1 may be mapped to RFIC port 1, antenna element 2 may be mapped to RFIC port 2, and so on). The remaining two antenna elements may be inactive antenna elements. In some aspects, the antenna module/panel may be based at least in part on a second architecture, in which one or more switches may map multiple antenna elements to each RFIC port (e.g., as shown in FIG. 6). The antenna module/panel may have 10 antenna elements on two sides, but only 8 RFIC ports. With the second architecture, two antenna elements may be selected via switches and mapped to RFIC port 4, and two more antenna elements may be selected and mapped to RFIC port 8. For example, antenna element 4 and antenna element 9 may be selected via a switch and mapped to RFIC port 4, and antenna element 5 and antenna element 10 may be selected via a switch and mapped to RFIC port 8. The UE may dynamically control switches so that a particular antenna element is connected to a particular RFIC port at a given time. For example, at a given time, antenna element 4 may be connected to RFIC port 4 and antenna element 9 may be connected to RFIC port 8.

Figure 7:
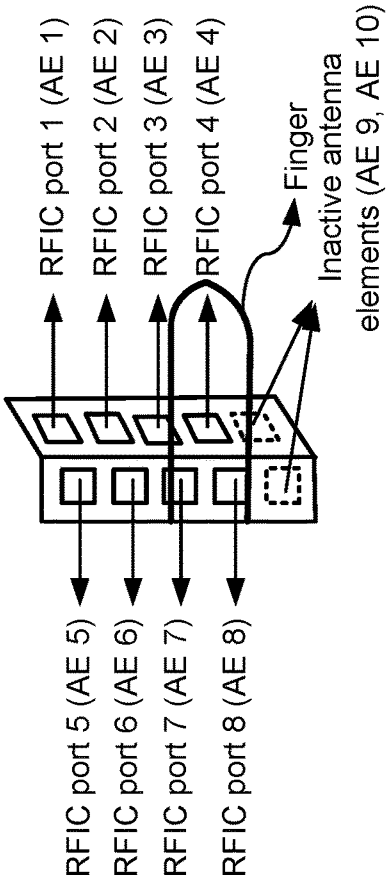
Figure 8:
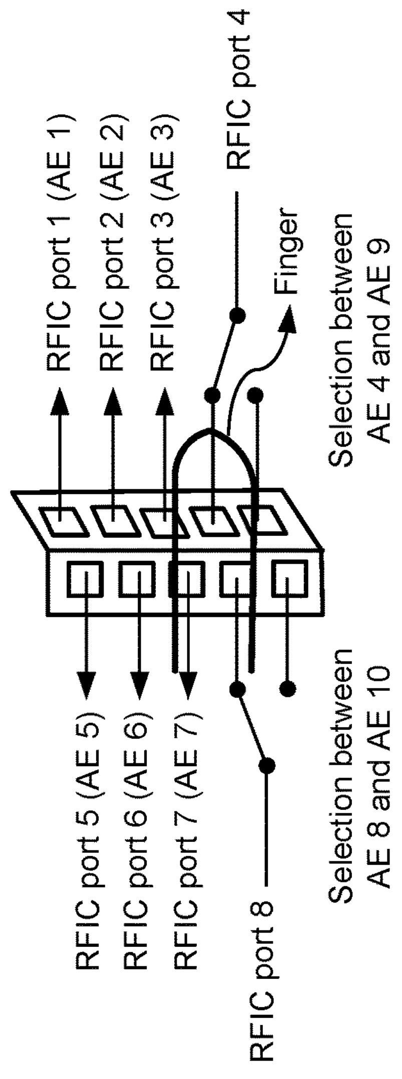

In some aspects, the second architecture may be particularly useful in a hand/finger blocking scenario. For example, in the hand/finger blocking scenario, the first architecture may lose antenna elements 3, 4, 7, and 8 in beamforming gain (e.g., as shown in FIG. 7), whereas the second architecture may only lose antenna elements 3 and 4 (e.g., as shown in FIG. 8). In the second architecture, a dynamic switch may occur to antenna elements 9 and 10, instead of antenna elements 7 and 8, where the dynamic switch may be based at least in part on a detected hand/finger blockage. Further, a switching loss associated with the second architecture may be smaller than a beamforming gain associated with a dynamic antenna element selection. The switching may be between a blocked antenna element and an unblocked antenna element, in relation to a particular RFIC port. The UE may detect when a certain antenna element is blocked, and the UE may instruct the antenna module/panel to adjust one or more switches to activate a certain antenna element that is unblocked. The UE may employ switching circuitry to switch between antenna elements when the hand/finger blocking scenario is detected by the UE, such that a path between a selected antenna element and the RFIC port is not blocked by a user's hand/finger.

In some aspects, the antenna module/panel may include additional antenna elements that are not always active. However, depending on a hand/finger that is blocking certain antenna elements, blocked antenna elements may be switched out and unblocked antenna elements may be switched in. As a result, hand/finger blockage may have less of a detrimental effect on a performance of the UE.

In some aspects, the antenna module/panel may be an L-shaped antenna module/panel. The antenna module/panel may have 10 antenna elements on two sides, but only 8 RFIC ports. Certain antenna elements may be dynamically selected on a first side, of the two sides, and certain antenna elements may be dynamically selected on a second side, of the two sides, where antenna elements may be dynamically selected on the first side and on the second side with various spacings. In a first option, three antenna elements may be selected on the first side and five antenna elements may be selected on the second side, and with a first spacing. In a second option, three antenna elements may be selected on the first side and five antenna elements may be selected on the second side, and with a second spacing. In a third option, four antenna elements may be selected on the first side and four antenna elements may be selected on the second side, and with a first spacing. In a fourth option, four antenna elements may be selected on the first side and four antenna elements may be selected on the second side, and with a second spacing. In some aspects, different combinations of antenna elements may be selected on either side, where each combination may be associated with its own spherical coverage tradeoffs. Different options may be associated with different performance levels, depending on a presence of hand/finger blockage or an absence of hand/finger blockage. For example, with no hand/finger blockage, an approximately 1.9 dB and 1.5 dB gain may be obtained over one and two 1×5 antenna modules/panels, respectively. With hand/finger blockage, an approximately 4.2 dB and 3.0 dB gain may be obtained over one and two 1×5 antenna modules/panels, respectively.

In some aspects, within the antenna module/panel, a number of antenna elements may be greater than a number of RFIC ports. For example, the antenna module/panel may include 10 antenna elements and 8 RFIC ports. Dynamic connections between the 10 antenna elements and the 8 RFIC ports may be done on a per polarization basis. A connection may require a switch that selects from one of a plurality of antenna element candidates, and the switch may become mapped to an RFIC port. As another example, the antenna module/panel may include 16 antenna elements and 4 RFIC ports. As yet another example, the antenna module/panel may include 8 antenna elements and 4 RFIC ports. In some aspects, a many-to-one switch may lead to increased switching losses, and multiple switches may also lead to more switching losses. Thus, a correct optimization may be a complex function of allowable switching losses.

As shown by reference number 406, the UE may perform, via the antenna elements, a communication to a network node. The UE may receive, via the antenna elements, a downlink transmission from the network node. The UE may transmit, via the antenna elements, an uplink transmission to the network node.

As indicated above, FIG. 4 is provided as an example. Other examples may differ from what is described with regard to FIG. 4.

FIG. 5 is a diagram illustrating an example 500 associated with mapping a plurality of antenna elements to an RFIC port in a UE, in accordance with the present disclosure.

As shown in FIG. 5, an antenna module/panel may be an L-shaped antenna module/panel. The antenna module/panel may be based at least in part on a first architecture, in which a fixed mapping may be defined between antenna elements (AEs) and RFIC ports. The antenna module/panel may have 10 antenna elements on two sides, but only 8 RFIC ports. With the first architecture, 8 antenna elements may be mapped in a fixed manner to 8 RFIC ports (e.g., antenna element 1 may be mapped to RFIC port 1, antenna element 2 may be mapped to RFIC port 2, and so on). A remaining two antenna elements may be inactive antenna elements.

As indicated above, FIG. 5 is provided as an example. Other examples may differ from what is described with regard to FIG. 5.

FIG. 6 is a diagram illustrating an example 600 associated with mapping a plurality of antenna elements to an RFIC port in a UE, in accordance with the present disclosure.

As shown in FIG. 6, an antenna module/panel may be an L-shaped antenna module/panel. The antenna module/panel may be based at least in part on a second architecture, in which one or more switches may map multiple antenna elements to each RFIC port. The antenna module/panel may have 10 antenna elements on two sides, but only 8 RFIC ports. With the second architecture, two antenna elements may be selected via switches and mapped to RFIC port 4, and two more antenna elements may be selected and mapped to RFIC port 8. For example, antenna element 4 or antenna element 9 may be selected via a switch and mapped to RFIC port 4, and antenna element 8 or antenna element 10 may be selected via a switch and mapped to RFIC port 8. The UE may dynamically control switches so that a particular antenna element is connected to a particular RFIC port at a given time. For example, at a given time, antenna element 4 may be connected to RFIC port 4 and antenna element 10 may be connected to RFIC port 8.

As indicated above, FIG. 6 is provided as an example. Other examples may differ from what is described with regard to FIG. 6.

FIG. 7 is a diagram illustrating an example 700 associated with mapping a plurality of antenna elements to an RFIC port in a UE, in accordance with the present disclosure.

As shown in FIG. 7, an antenna module/panel may be an L-shaped antenna module/panel. The antenna module/panel may be based at least in part on a first architecture, in which a fixed mapping may be defined between antenna elements and RFIC ports. The antenna module/panel may have 10 antenna elements on two sides, but only 8 RFIC ports. With the first architecture, 8 antenna elements may be mapped in a fixed manner to 8 RFIC ports (e.g., antenna element 1 may be mapped to RFIC port 1, antenna element 2 may be mapped to RFIC port 2, and so on). A remaining two antenna elements may be inactive antenna elements. In some aspects, in a hand/finger blocking scenario, antenna elements 3, 4, 7, and 8 may be blocked by a user's finger. In the hand/finger blocking scenario, antenna elements 3, 4, 7, and 8 may be lost in beamforming gain based at least in part on the first architecture.

As indicated above, FIG. 7 is provided as an example. Other examples may differ from what is described with regard to FIG. 7.

FIG. 8 is a diagram illustrating an example 800 associated with mapping a plurality of antenna elements to an RFIC port in a UE, in accordance with the present disclosure.

As shown in FIG. 8, an antenna module/panel may be an L-shaped antenna module/panel. The antenna module/panel may be based at least in part on a second architecture, in which one or more switches may map multiple antenna elements to each RFIC port. The antenna module/panel may have 10 antenna elements on two sides, but only 8 RFIC ports. With the second architecture, two antenna elements may be selected via switches and mapped to RFIC port 4, and two more antenna elements may be selected and mapped to RFIC port 8. In some aspects, in a hand/finger blocking scenario, antenna elements 3 and 4 may be lost in beamforming gain based at least in part on the second architecture. Due to dynamic antenna element switching in the second architecture, antenna elements 9 and 10 may be switched on instead of antenna elements 7 and 8 (which may be blocked by a user's finger). As a result, the antenna module/panel may only lose two antenna elements due to hand/finger blockage, as opposed to four antenna elements when the antenna module/panel is associated with a fixed mapping.

As indicated above, FIG. 8 is provided as an example. Other examples may differ from what is described with regard to FIG. 8.

Figure 9:
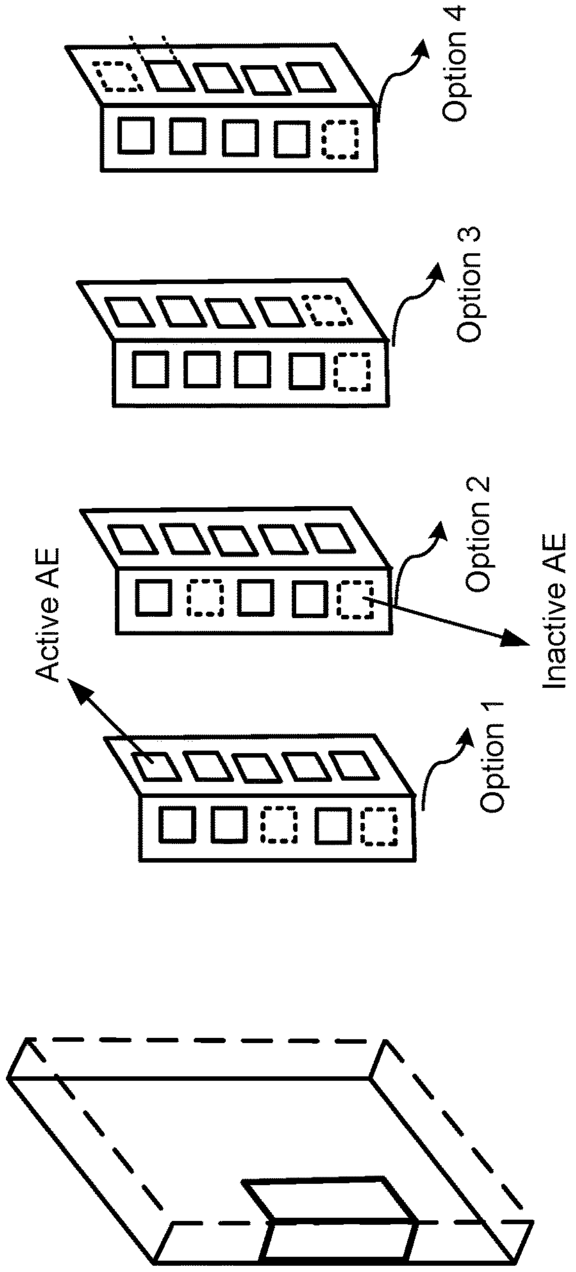

FIG. 9 is a diagram illustrating an example 900 associated with mapping a plurality of antenna elements to an RFIC port in a UE, in accordance with the present disclosure.

As shown in FIG. 9, an antenna module/panel may be an L-shaped antenna module/panel. The antenna module/panel may have 10 antenna elements on two sides, but only 8 RFIC ports. The 10 antenna elements may be connected to the 8 RFIC ports via switches. Certain antenna elements may be selected on a first side, of the two sides, and certain antenna elements may be selected on a second side, of the two sides, where antenna elements may be selected on the first side and on the second side with various spacings. In a first option, three antenna elements may be selected on the first side and five antenna elements may be selected on the second side, and with a first spacing. In a second option, three antenna elements may be selected on the first side and five antenna elements may be selected on the second side, and with a second spacing. In both the first option and the second option, two antenna elements may be inactive on the first side. In a third option, four antenna elements may be selected on the first side and four antenna elements may be selected on the second side, and with a first spacing. In a fourth option, four antenna elements may be selected on the first side and four antenna elements may be selected on the second side, and with a second spacing.

As indicated above, FIG. 9 is provided as an example. Other examples may differ from what is described with regard to FIG. 9.

Figure 10:
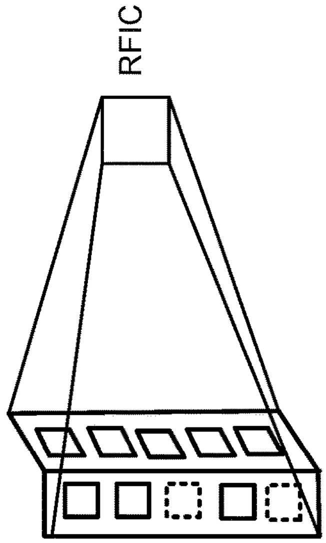

FIG. 10 is a diagram illustrating an example 1000 associated with mapping a plurality of antenna elements to an RFIC port in a UE, in accordance with the present disclosure.

As shown in FIG. 10, an antenna module/panel may be an L-shaped antenna module/panel. The antenna module/panel may have 10 antenna elements on two sides, but only 8 RFIC ports. The antenna module/panel may be associated with a single RFIC. In other words, 8 antenna elements that are active at a given time may be associated with the 8 RFIC ports, which may be associated with the single RFIC.

As indicated above, FIG. 10 is provided as an example. Other examples may differ from what is described with regard to FIG. 10.

Figure 11:
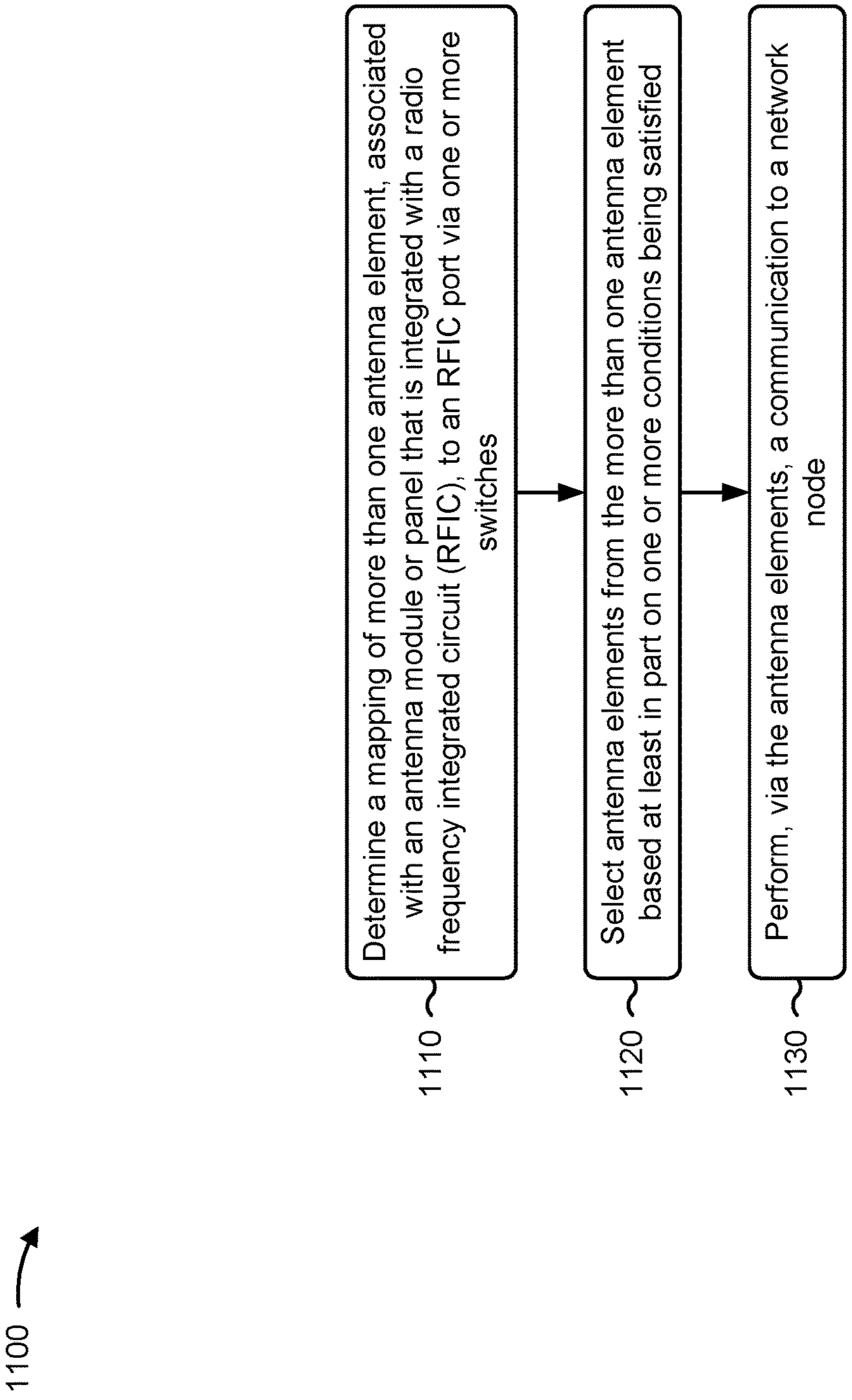
FIG. 11 is a diagram illustrating an example process associated with mapping a plurality of antenna elements to an RFIC port in a UE, in accordance with the present disclosure.

FIG. 11 is a diagram illustrating an example process 1100 performed, for example, by a UE, in accordance with the present disclosure. Example process 1100 is an example where the UE (e.g., UE 120) performs operations associated with mapping a plurality of antenna elements to an RFIC port in a UE.

As shown in FIG. 11, in some aspects, process 1100 may include determining a mapping of more than one antenna element, associated with an antenna module/panel that is integrated with an RFIC, to an RFIC port via one or more switches (block 1110). For example, the UE (e.g., using communication manager 1206, depicted in FIG. 12) may determine a mapping of more than one antenna element, associated with an antenna module/panel that is integrated with an RFIC, to an RFIC port via one or more switches, as described above.

As further shown in FIG. 11, in some aspects, process 1100 may include selecting antenna elements from the more than one antenna element based at least in part on one or more conditions being satisfied (block 1120). For example, the UE (e.g., using communication manager 1206, depicted in FIG. 12) may select antenna elements from the more than one antenna element based at least in part on one or more conditions being satisfied, as described above.

As further shown in FIG. 11, in some aspects, process 1100 may include performing, via the antenna elements, a communication to a network node (block 1130). For example, the UE (e.g., using communication manager 1206, depicted in FIG. 12) may perform, via the antenna elements, a communication to a network node, as described above.

Process 1100 may include additional aspects, such as any single aspect or any combination of aspects described below and/or in connection with one or more other processes described elsewhere herein.

In a first aspect, the antenna module is associated with a plurality of antenna elements and a plurality of RFIC ports, and a first quantity associated with the plurality of antenna elements is greater than a second quantity associated with the plurality of RFIC ports.

In a second aspect, alone or in combination with the first aspect, process 1100 includes selecting the antenna elements based at least in part on a blockage event associated with the UE, and the blockage event is associated with one of a hand or finger blockage in relation to certain antenna elements of the antenna module/panel.

In a third aspect, alone or in combination with one or more of the first and second aspects, the one or more conditions comprise power conditions or thermal conditions associated with the UE.

In a fourth aspect, alone or in combination with one or more of the first through third aspects, the one or more conditions comprise elemental gain variations associated with the UE.

In a fifth aspect, alone or in combination with one or more of the first through fourth aspects, the one or more conditions comprise a polarization performance associated with the UE.

In a sixth aspect, alone or in combination with one or more of the first through fifth aspects, the one or more conditions comprise an impact of a UE housing or a material on a performance of the antenna element.

In a seventh aspect, alone or in combination with one or more of the first through sixth aspects, the mapping of the more than one antenna element to the RFIC port is done on a per polarization basis.

In an eighth aspect, alone or in combination with one or more of the first through seventh aspects, the RFIC port is associated with the RFIC that is integrated with the antenna module/panel.

In a ninth aspect, alone or in combination with one or more of the first through eighth aspects, a switching loss associated with the one or more switches used in selecting the antenna elements is smaller than a beamforming gain associated with a dynamic selection of the antenna elements.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
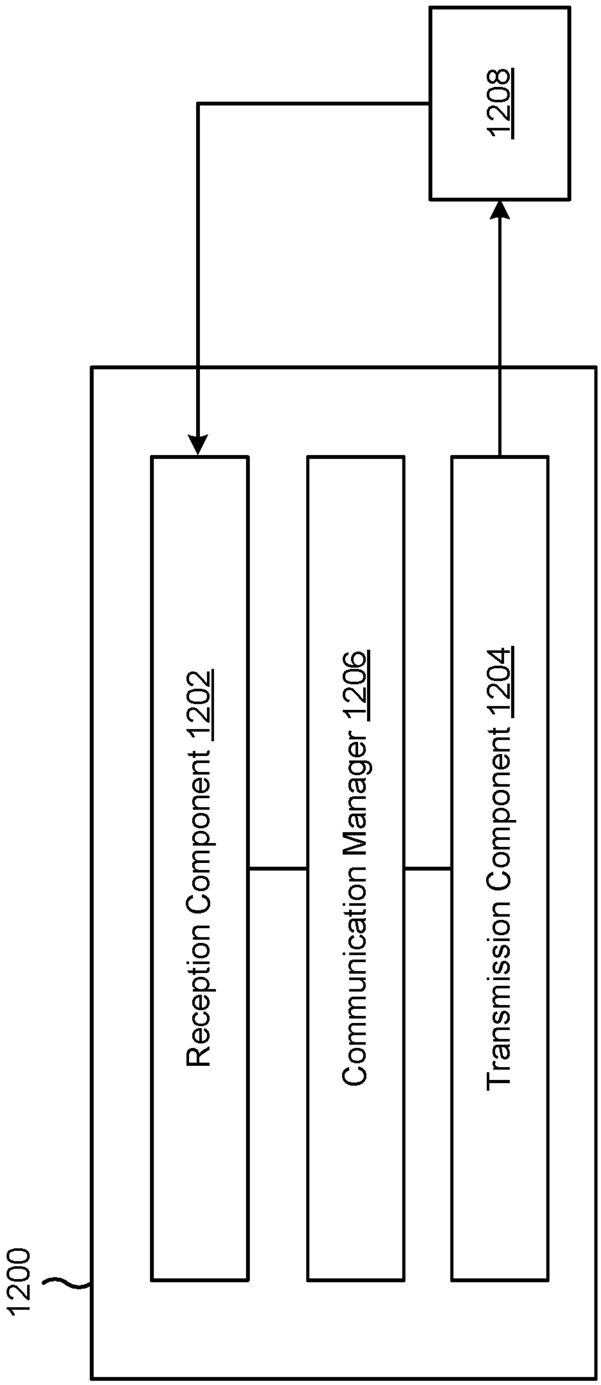
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a UE, or a UE may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 140 described in connection with FIG. 1. As shown, the apparatus 1200 may communicate with another apparatus 1208, such as a UE or a network node (such as a CU, a DU, an RU, or a base station), using the reception component 1202 and the transmission component 1204.

In some aspects, the apparatus 1200 may be configured to perform one or more operations described herein in connection with FIGS. 4-10. Additionally, or alternatively, the apparatus 1200 may be configured to perform one or more processes described herein, such as process 1100 of FIG. 11. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

The communication manager 1206 may support operations of the reception component 1202 and/or the transmission component 1204. For example, the communication manager 1206 may receive information associated with configuring reception of communications by the reception component 1202 and/or transmission of communications by the transmission component 1204. Additionally, or alternatively, the communication manager 1206 may generate and/or provide control information to the reception component 1202 and/or the transmission component 1204 to control reception and/or transmission of communications.

The apparatus 1200 may include means for determining a mapping of more than one antenna element, associated with an antenna module/panel that is integrated with an RFIC, to an RFIC port via one or more switches. The apparatus 1200 may include means for selecting antenna elements from the more than one antenna element based at least in part on one or more conditions being satisfied. The apparatus 1200 may include means for performing, via the antenna elements, a communication to a network node.

The communication manager 1206 may determine a mapping of more than one antenna element, associated with an antenna module/panel that is integrated with an RFIC, to an RFIC port via one or more switches. The communication manager 1206 may select antenna elements from the more than one antenna element based at least in part on one or more conditions being satisfied. The communication manager 1206 may perform, via the antenna elements, a communication to a network node.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: determining a mapping of more than one antenna element, associated with an antenna module or panel that is integrated with a radio frequency integrated circuit (RFIC), to an RFIC port via one or more switches; selecting antenna elements from the more than one antenna element based at least in part on one or more conditions being satisfied; and performing, via the antenna elements, a communication to a network node.

Aspect 2: The method of Aspect 1, wherein the antenna module is associated with a plurality of antenna elements and a plurality of RFIC ports, and a first quantity associated with the plurality of antenna elements is greater than a second quantity associated with the plurality of RFIC ports.

Aspect 3: The method of any of Aspects 1-2, wherein selecting the antenna elements is based at least in part on a blockage event associated with the UE, and the blockage event is associated with one of a hand or finger blockage in relation to one or more antenna elements of the antenna module or panel.

Aspect 4: The method of any of Aspects 1-3, wherein selecting the antenna elements is based at least in part on elemental gain variations associated with the UE.

Aspect 5: The method of any of Aspects 1-4, wherein selecting the antenna elements is based at least in part on a polarization performance associated with the UE.

Aspect 6: The method of any of Aspects 1-5, wherein selecting the antenna elements is based at least in part on an impact of a UE housing or a material on a performance of the antenna element.

Aspect 7: The method of any of Aspects 1-6, wherein selecting the antenna elements is based at least in part on power conditions or thermal conditions associated with the UE.

Aspect 8: The method of any of Aspects 1-7, wherein the mapping of the more than one antenna element to the RFIC port is done on a per polarization basis.

Aspect 9: The method of any of Aspects 1-8, wherein the RFIC port is associated with the RFIC that is integrated with the antenna module or panel.

Aspect 10: The method of any of Aspects 1-9, wherein a switching loss associated with the one or more switches used in selecting the antenna elements is smaller than a beamforming gain associated with a dynamic selection of the antenna elements.

Aspect 11: An apparatus for wireless communication at a device, comprising a processor; memory coupled with the processor; and instructions stored in the memory and executable by the processor to cause the apparatus to perform the method of one or more of Aspects 1-10.

Aspect 12: A device for wireless communication, comprising a memory and one or more processors coupled to the memory, the one or more processors configured to perform the method of one or more of Aspects 1-10.

Aspect 13: An apparatus for wireless communication, comprising at least one means for performing the method of one or more of Aspects 1-10.

Aspect 14: A non-transitory computer-readable medium storing code for wireless communication, the code comprising instructions executable by a processor to perform the method of one or more of Aspects 1-10.

Aspect 15: A non-transitory computer-readable medium storing a set of instructions for wireless communication, the set of instructions comprising one or more instructions that, when executed by one or more processors of a device, cause the device to perform the method of one or more of Aspects 1-10.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:

one or more memories; and one or more processors coupled to the one or more memories, the one or more processors individually or collectively configured to:

determine a mapping of more than one antenna element to a single radio frequency integrated circuit (RFIC) port via one or more switches disposed within an antenna module or panel that is integrated with a RFIC, wherein the more than one antenna elements are associated with the antenna module or panel, and wherein the single RFIC port is associated with the RFIC;

select antenna elements from the more than one antenna element based at least in part on one or more conditions being satisfied; and perform, via the antenna elements, a communication to a network node.

2. The apparatus of claim 1, wherein the antenna module is associated with a plurality of antenna elements and a plurality of RFIC ports, and a first quantity associated with the plurality of antenna elements is greater than a second quantity associated with the plurality of RFIC ports.

3. The apparatus of claim 1, wherein the one or more processors are individually or collectively configured to select the antenna elements based at least in part on a blockage event associated with the UE, and the blockage event is associated with one of a hand or finger blockage in relation to certain antenna elements of the antenna module or panel.

4. The apparatus of claim 1, wherein the one or more conditions comprise power conditions or thermal conditions associated with the UE.

5. The apparatus of claim 1, wherein the one or more conditions comprise elemental gain variations associated with the UE.

6. The apparatus of claim 1, wherein the one or more conditions comprise a polarization performance associated with the UE.

7. The apparatus of claim 1, wherein the one or more conditions comprise an impact of a UE housing or a material on a performance of the more than one antenna element.

8. The apparatus of claim 1, wherein the mapping of the more than one antenna element to the RFIC port is done on a per polarization basis.

9. The apparatus of claim 1, wherein the RFIC port is associated with the RFIC that is integrated with the antenna module or panel.

10. The apparatus of claim 1, wherein a switching loss associated with the one or more switches used in selecting the antenna elements is smaller than a beamforming gain associated with a dynamic selection of the antenna elements.

11. A method of wireless communication performed by a user equipment (UE), comprising:

determining a mapping of more than one antenna element to a single radio frequency integrated circuit (RFIC) port via one or more switches disposed within an antenna module or panel that is integrated with a RFIC, wherein the more than one antenna elements are associated with the antenna module or panel, and wherein the single RFIC port is associated with the RFIC;

selecting antenna elements from the more than one antenna element based at least in part on one or more conditions being satisfied; and performing, via the antenna elements, a communication to a network node.

12. The method of claim 11, wherein the antenna module is associated with a plurality of antenna elements and a plurality of RFIC ports, and a first quantity associated with the plurality of antenna elements is greater than a second quantity associated with the plurality of RFIC ports.

13. The method of claim 11, wherein selecting the antenna elements is based at least in part on a blockage event associated with the UE, and the blockage event is associated with one of a hand or finger blockage in relation to certain antenna elements of the antenna module or panel.

14. The method of claim 11, wherein selecting the antenna elements is based at least in part on power conditions or thermal conditions associated with the UE.

15. The method of claim 11, wherein selecting the antenna elements is based at least in part on elemental gain variations associated with the UE.

16. The method of claim 11, wherein selecting the antenna elements is based at least in part on a polarization performance associated with the UE.

17. The method of claim 11, wherein selecting the antenna elements is based at least in part on an impact of a UE housing or a material on a performance of the more than one antenna element.

18. The method of claim 11, wherein the mapping of the more than one antenna element to the RFIC port is done on a per polarization basis.

19. The method of claim 11, wherein the RFIC port is associated with the RFIC that is integrated with the antenna module or panel.

20. The method of claim 11, wherein a switching loss associated with the one or more switches used in selecting the antenna elements is smaller than a beamforming gain associated with a dynamic selection of the antenna elements.

21. A non-transitory computer-readable medium storing a set of instructions for wireless communication, the set of instructions comprising:

one or more instructions that, when executed by one or more processors of a user equipment (UE), cause the UE to:

determine a mapping of more than one antenna element to a single radio frequency integrated circuit (RFIC) port via one or more switches disposed within an antenna module or panel that is integrated with a RFIC, wherein the more than one antenna elements are associated with the antenna module or panel, and wherein the single RFIC port is associated with the RFIC;

select antenna elements from the more than one antenna element based at least in part on one or more conditions being satisfied; and perform, via the antenna elements, a communication to a network node.

22. The non-transitory computer-readable medium of claim 21, wherein the antenna module is associated with a plurality of antenna elements and a plurality of RFIC ports, and a first quantity associated with the plurality of antenna elements is greater than a second quantity associated with the plurality of RFIC ports.

23. The non-transitory computer-readable medium of claim 21, wherein the antenna elements are selected based at least in part on one or more of: power conditions or thermal conditions associated with the UE, elemental gain variations associated with the UE, a polarization performance associated with the UE, an impact of a UE housing or a material on a performance of the antenna element, or a blockage event associated with the UE.

24. The non-transitory computer-readable medium of claim 21, wherein the mapping of the more than one antenna element to the RFIC port is done on a per polarization basis.

25. The non-transitory computer-readable medium of claim 21, wherein the RFIC port is associated with the RFIC that is integrated with the antenna module or panel, and a switching loss associated with the one or more switches used in selecting the antenna elements is smaller than a beamforming gain associated with a dynamic selection of the antenna elements.

26. An apparatus for wireless communication, comprising:

means for determining a mapping of more than one antenna element to a single radio frequency integrated circuit (RFIC) port via one or more switches disposed within an antenna module or panel that is integrated with a RFIC, wherein the more than one antenna elements are associated with the antenna module or panel, and wherein the single RFIC port is associated with the RFIC;

means for selecting antenna elements from the more than one antenna element based at least in part on one or more conditions being satisfied; and means for performing, via the antenna elements, a communication to a network node.

27. The apparatus of claim 26, wherein the antenna module is associated with a plurality of antenna elements and a plurality of RFIC ports, and a first quantity associated with the plurality of antenna elements is greater than a second quantity associated with the plurality of RFIC ports.

28. The apparatus of claim 26, wherein the antenna elements are selected based at least in part on one or more of: power conditions or thermal conditions, elemental gain variations, a polarization performance, an impact of a housing or a material on a performance of the antenna elements, or a blockage event.

29. The apparatus of claim 26, wherein the mapping of the more than one antenna element to the RFIC port is done on a per polarization basis.

30. The apparatus of claim 26, wherein the RFIC port is associated with the RFIC that is integrated with the antenna module or panel, and a switching loss associated with the one or more switches used in selecting the antenna elements is smaller than a beamforming gain associated with a dynamic selection of the antenna elements.

* * * * *